United States Patent
Stoves

[11] Patent Number: 5,971,404
[45] Date of Patent: Oct. 26, 1999

[54] SELF-CENTERING SUSPENSION FOR IN-PIPE USE

[75] Inventor: Derek Stoves, Newcastle upon Tyne, United Kingdom

[73] Assignee: BG plc, United Kingdom

[21] Appl. No.: 08/952,447

[22] PCT Filed: May 20, 1996

[86] PCT No.: PCT/GB96/01200

§ 371 Date: Feb. 12, 1998

§ 102(e) Date: Feb. 12, 1998

[87] PCT Pub. No.: WO96/37726

PCT Pub. Date: Nov. 28, 1996

[30] Foreign Application Priority Data

May 22, 1995 [GB] United Kingdom .................... 9510317

[51] Int. Cl.[6] ........................................................ B60S 9/00
[52] U.S. Cl. ............................... 280/6.154; 280/124.166; 15/104.05; 104/138.2
[58] Field of Search .............................. 280/6.154, 6.155, 280/124.128, 124.166, 124.169, 124.129; 15/104.05, 104.31, 304; 104/138.2; 403/82, 111

[56] References Cited

U.S. PATENT DOCUMENTS

| | | | |
|---|---|---|---|
| 2,579,813 | 12/1951 | Frank | 15/104.061 |
| 2,742,259 | 4/1956 | Boucher | 254/134.5 |
| 4,006,359 | 2/1977 | Sullins et al. | 378/60 |
| 4,218,923 | 8/1980 | Triplett et al. | . |
| 4,537,136 | 8/1985 | Douglas | 104/138.2 |
| 5,018,451 | 5/1991 | Hapstack | 104/138.2 |
| 5,428,862 | 7/1995 | Sailer | 15/304 |

FOREIGN PATENT DOCUMENTS

| | | |
|---|---|---|
| 0 085 504 | 8/1983 | European Pat. Off. . |
| 1 205 515 | 9/1970 | United Kingdom . |
| 1 502 829 | 3/1978 | United Kingdom . |

*Primary Examiner*—J. J. Swann
*Assistant Examiner*—David R. Dunn
*Attorney, Agent, or Firm*—Larson & Taylor

[57] ABSTRACT

A self-centering suspension for use in supporting a vehicle or vehicles intended to travel in a pipeline includes a body and two sets of three wheels spaced apart along the length of the body. Each wheel is mounted on a lever arm biased by torsion springs against the inner surface of the pipeline. Each lever arm has a stub arm which is eccentrically arranged relatively to a rotary joint in the form of a pin, and the stub arm slidingly engages a circumferential groove in a ring. Each ring slides on the body. A set of three wheels are thus constrained to move inwards and outwards together.

4 Claims, 3 Drawing Sheets

SELF-CENTERING SUSPENSION FOR IN-PIPE USE

FIELD OF THE INVENTION

The invention relates to self-centering suspensions for in-pipe use.

BACKGROUND OF THE INVENTION

In-pipe vehicles which require centering within the pipe are normally supported by polymer cups, wire brushes, or several wheels on independently spring loaded lever arms. The former two generate high levels of frictional resistance, and the latter requires relatively stiff springs on the lever arms partially to counteract the load exerted by the opposite lever arms. Therefore centralising a vehicle in a pipe to within accurate limits, while maintaining some automatic adjustment for variations in pipe size, is difficult to achieve and requires large forces, thus high frictional resistance to linear motion of the vehicle, and high resistance to traversing a pipe of reducing diameter.

SUMMARY OF THE INVENTION

According to the invention there is provided a self-centering suspension for use in supporting a vehicle or vehicle intended to travel in a pipeline, said suspension comprising a body and a set of wheels, each wheel being mounted at a first end of an arm having a second end connected to said body by a rotary joint permitting the wheel to move inwards and outwards to accommodate changes in the diameter of an inner surface of the pipeline as the wheels traverse the inner surface, spring means arranged to be stressed by inward movement of said wheel, each arm having a stub arm eccentrically arranged with respect to said rotary joint, each stub arm slidingly engaging a circumferential groove in a ring reciprocable on the body longitudinally thereof, and the stub arms and ring together forming coupling means arranged to allow only movement of all the wheels in the set simultaneously.

Preferably, said spring means comprises respective rotary spring means arranged between said arm in each case and the body, and the spring means being arranged around the respectice rotary joint.

DETAILED DESCRIPTION OF THE DRAWINGS

The invention will now be further described, by way of example, with reference to the accompanying drawings in which.

DETAILED DESCRIPTION OF THE PREFERRED EMBODIMENTS

Figure 1:
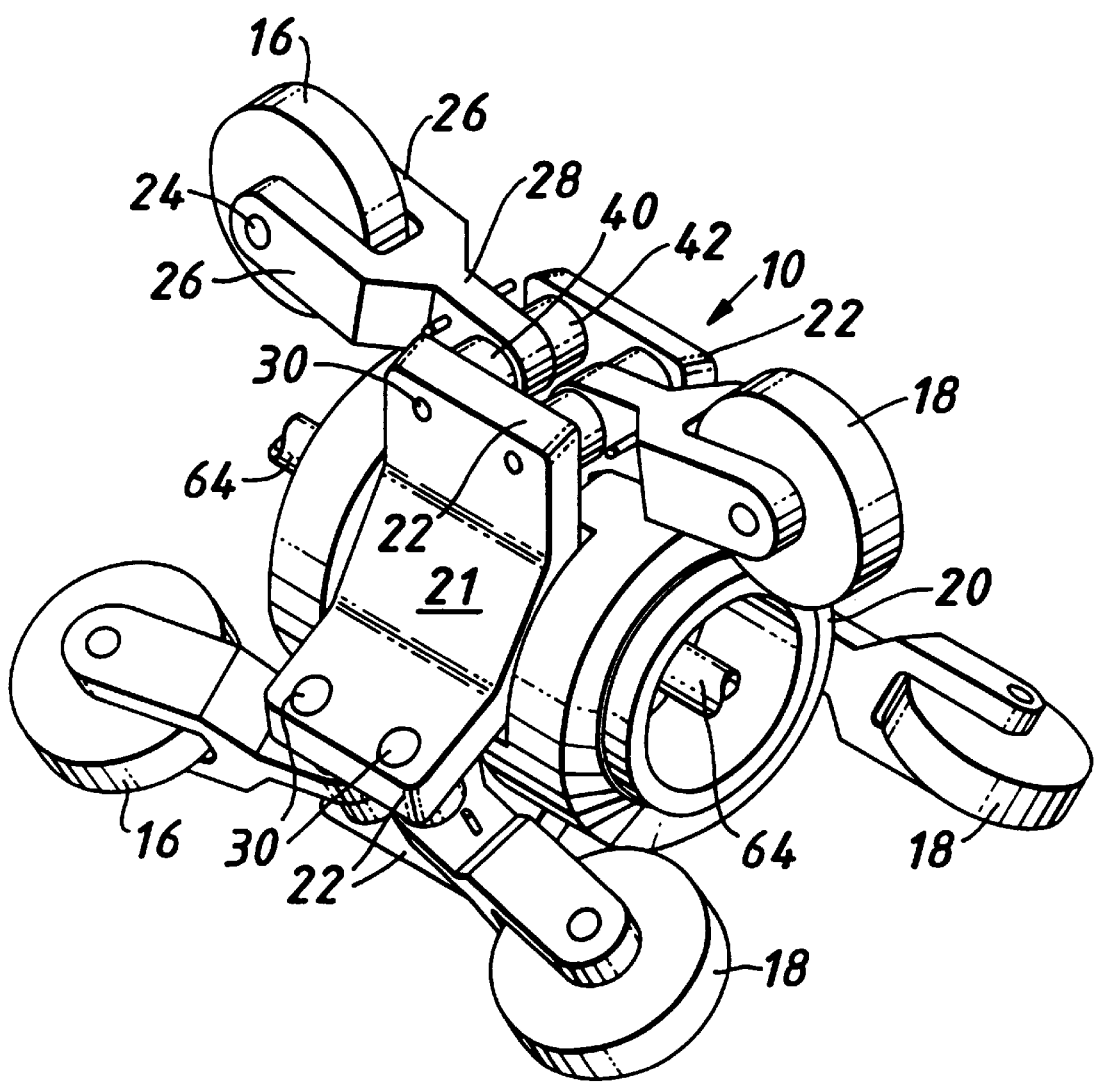
FIG. 1 is a diagrammatic three-dimensional view of the suspension.
Figure 2:
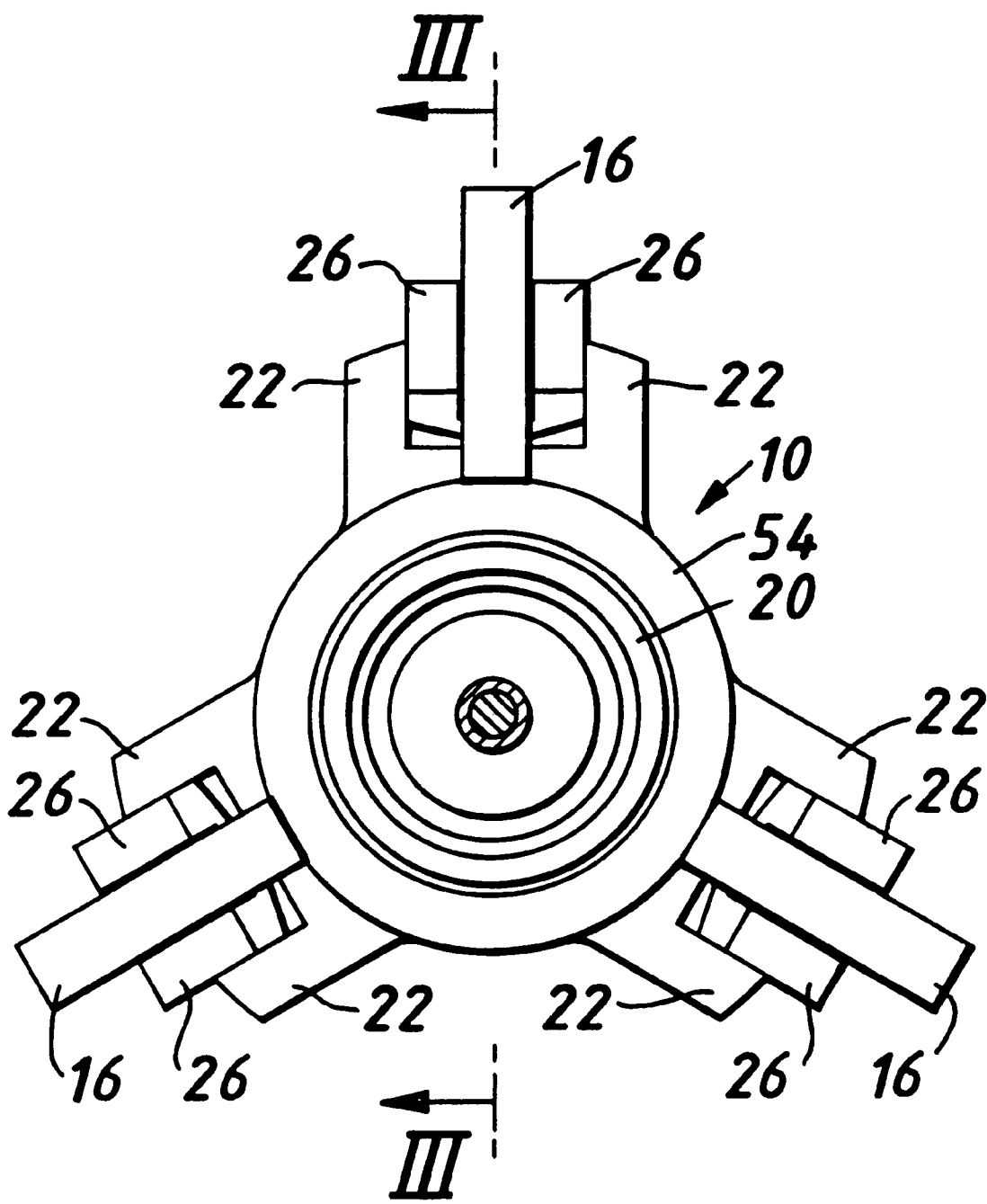
FIG. 2 is an end elevation of the suspension shown in FIG. 1.
Figure 3:
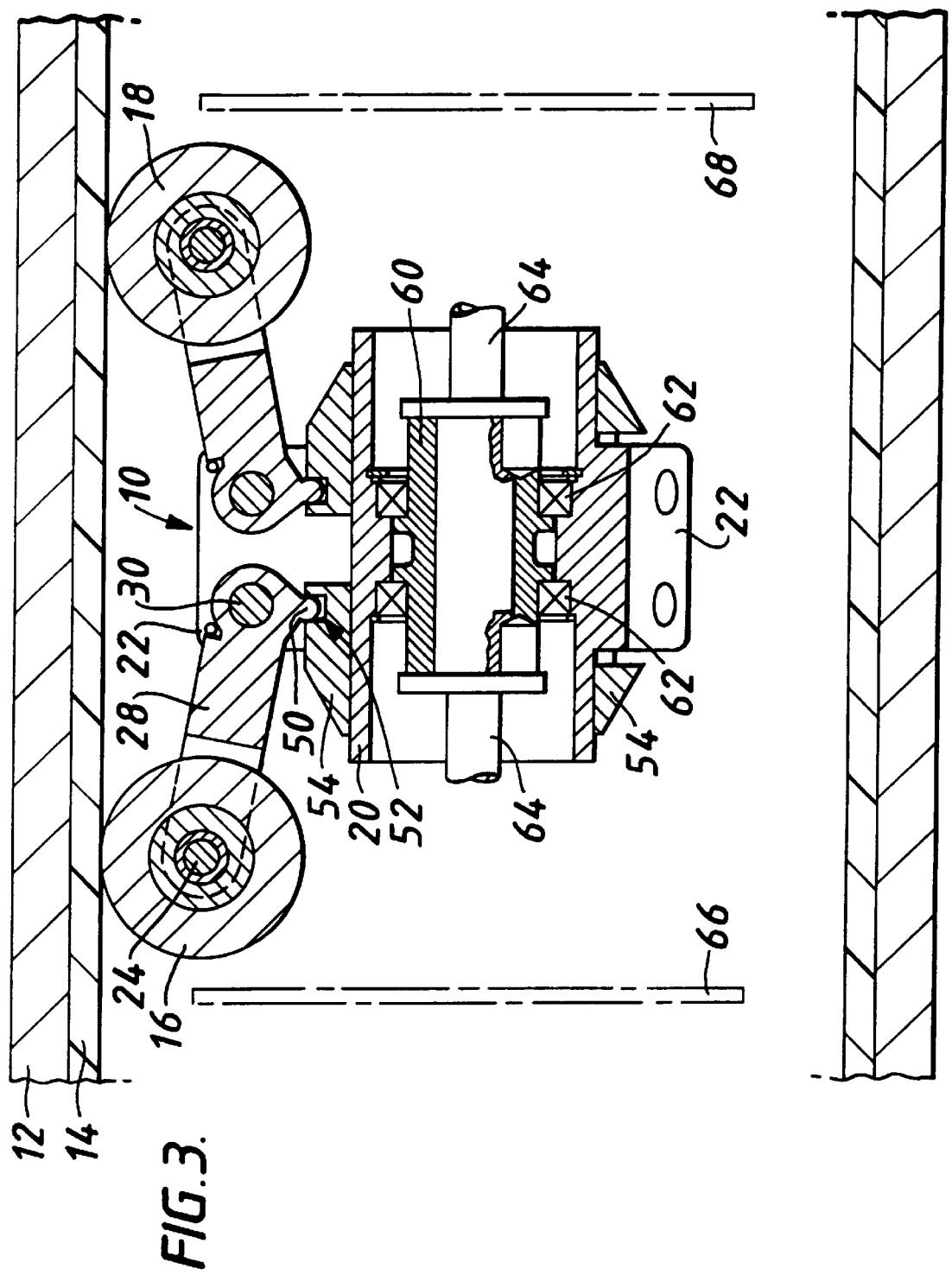
FIG. 3 is a vertical cross-section on the line III—III in FIG. 2, with parts removed.

FIG. 1 to 3 show a self-centering suspension 10 for use in supporting a vehicle intended to travel in a pipeline 12. For example, the pipeline 12 is a cast iron gas main and contains a liner 14 of polyethylene upon the inner surface of which wheels 16, 18 run. There are three wheels 16 in a first set of wheels spaced apart equiangularly around a body 20. There are three wheels 18 in a second set of wheels also spaced apart equiangularly around the body 20. The wheels 18 each lie in a common plane with a wheel 16 in this example. However, this is not essential and the wheels 16, 18 may lie in different planes. The two sets of wheels 16, 18 are spaced apart along the length of the body 20.

The vehicle is intended to be used, in this example, for the purpose of cutting an aperture in the liner at an offtake so that a plastic service pipe can be inserted in an existing steel service pipe and the plastic pipe joined to the liner at the aperture cut by the machine. However, the invention is operable in pipelines and ducts whether they are lined or not.

The body 20 carries three brackets 21 arranged equiangularly about the body 20. Each bracket 21 terminates at opposite ends in arms 22.

The following description applies to the first set of wheels 16.

Each wheel 16 is mounted on a pin 24 between two arms 26 of a fork formed at one end of a lever arm 28. The other end of the lever arm 28 is connected by a rotary joint in the form of a pin 30 to adjacent arms 22 of the brackets 21.

Torsion springs 40, 42 are arranged around the pin 30 between the lever arm 28 and the arms 22 fixed to the body 20. Inward movement of the wheel 16 and the lever arm 28 stresses the torsion springs 40, 42.

The lever arm 28 has a stub arm 50 eccentrically arranged with respect to the rotary joint or pin 30 and the end of the stub arm 50 slidingly engages opposite side walls of a circumferential groove 52 formed in the exterior surface of a ring 54. The ring 54 embraces the body 20 and is free to slide to and fro along the body 20 in the lengthwise direction.

Thus, the three wheels 16 of the first set are constrained to move together inwards and outwards relatively to the body 20 as the diameter of the inner surface of the liner 14 varies during travel of the suspension along the pipeline 12. The stub arm 50 and the ring 54 together form a coupling means by which only movement of all of the lever arms 28 is allowed.

The description of the first set of wheels 16 just given above applies in similar fashion to the second set of wheels 18.

The body 20 is hollow and it contains a bearing member 60 supported on the body 20 by two ball bearings 62. The bearing member 60 is connected at each end to a coupling rod 64 which is connected to a vehicle in a train of vehicles intended to travel along the inside of the pipeline 12. End plates 66, 68 are shown which are connected to the vehicles (not shown) on either side of the suspension 10. A suspension 10 which is last in the train of vehicles can support only one vehicle, of course. The weight of the vehicles is supported only by the suspension 10 and by similar suspensions (not shown) arranged in similar fashion beyond the distant ends of the vehicles.

The provision of the bearings 62 enables the vehicles to be rotated relatively to the suspension 10.

The springs 40, 42 are chosen so that there is a pre-load in the springs when the suspension 10 enters the pipeline 12. The pre-load is chosen so that the springs hold the vehicles centralized in the pipeline 12 for all the diameters of the inner surface of the liner 14 to be encountered.

The suspension has been developed to achieve accurate centralization, using a wheeled system to minimize resistance to linear motion, and interconnecting the centralizing lever arms to ensure that the only force on the supported body is to encourage centering of it rather than opposing its centering.

Any displacement of the body 20 from the center line of the pipe creates an inward force on the wheel or wheels opposing the displacement which in turn creates deflection of the remaining wheel or wheels in the set. There is thus created a centering force on the body. There will remain a centering force on the body until all three arms again contact the pipe wall, thus removing the centering force and stabilizing the body.

Since all three lever arms are compressed simultaneously by any eccentric movement of the body, the individual spring stiffness and preload is considerably less than that required of independent lever arms. The energy absorbed in centering the vehicle is therefore lower, and the frictional resistance to linear travel will therefore be lower.

This approach to suspending a the body of a vehicle concentrically within a pipe provides significant advantages, particularly where accuracy of centering is important and where it is necessary to minimize the energy absorbed by traversing the vehicle along the pipe.

In a modification, not shown, the springs 40, 42 can be replaced by springs other than torsion springs. For example, the lever arms can act on compression springs, on extension springs, on leaf springs or on blocks of resilient material.

I claim:

1. A self-centering suspension for use in supporting a vehicle intended to travel in a pipeline, said suspension comprising a body and a set of wheels, each wheel being mounted at a first end of an arm having a second end connected to said body by a rotary joint permitting the wheel to move inwards and outwards to accommodate changes in diameter of an inner surface of the pipeline as the wheels traverse the inner surface, each of said arms having a stub arm eccentrically arranged with respect to said rotary joint, each stub arm slidingly engaging a circumferential groove in a ring slidable along a length of the body, spring means arranged to be stressed by inward movement of a respective one of said wheels and to stress said arm outwardly such that said stub arm stays in the groove, and the stub arms and ring together forming coupling means allowing simultaneous movement of all the wheels in the set.

2. The suspension according to claim 1, wherein said spring means comprises respective rotary spring means arranged between a respective one of said arms and the body, and the rotary spring means being arranged around a respective one of the rotary joints.

3. The suspension according to claim 1, comprising two sets of wheels, each of said sets including three wheels.

4. The suspension according to claim 1, wherein said body includes two sets of wheels and two coupling means, one of said coupling means allowing movement of only the wheels in one of said two sets and the other of said coupling means allowing movement of only the wheels in the other of said two sets.

* * * * *